BI-ANGULAR SYSTEM GEOMETRY

INVENTOR.
FREDERICK BLANCKE SYLVANDER
BY Herbert T. Davis
ATTORNEY

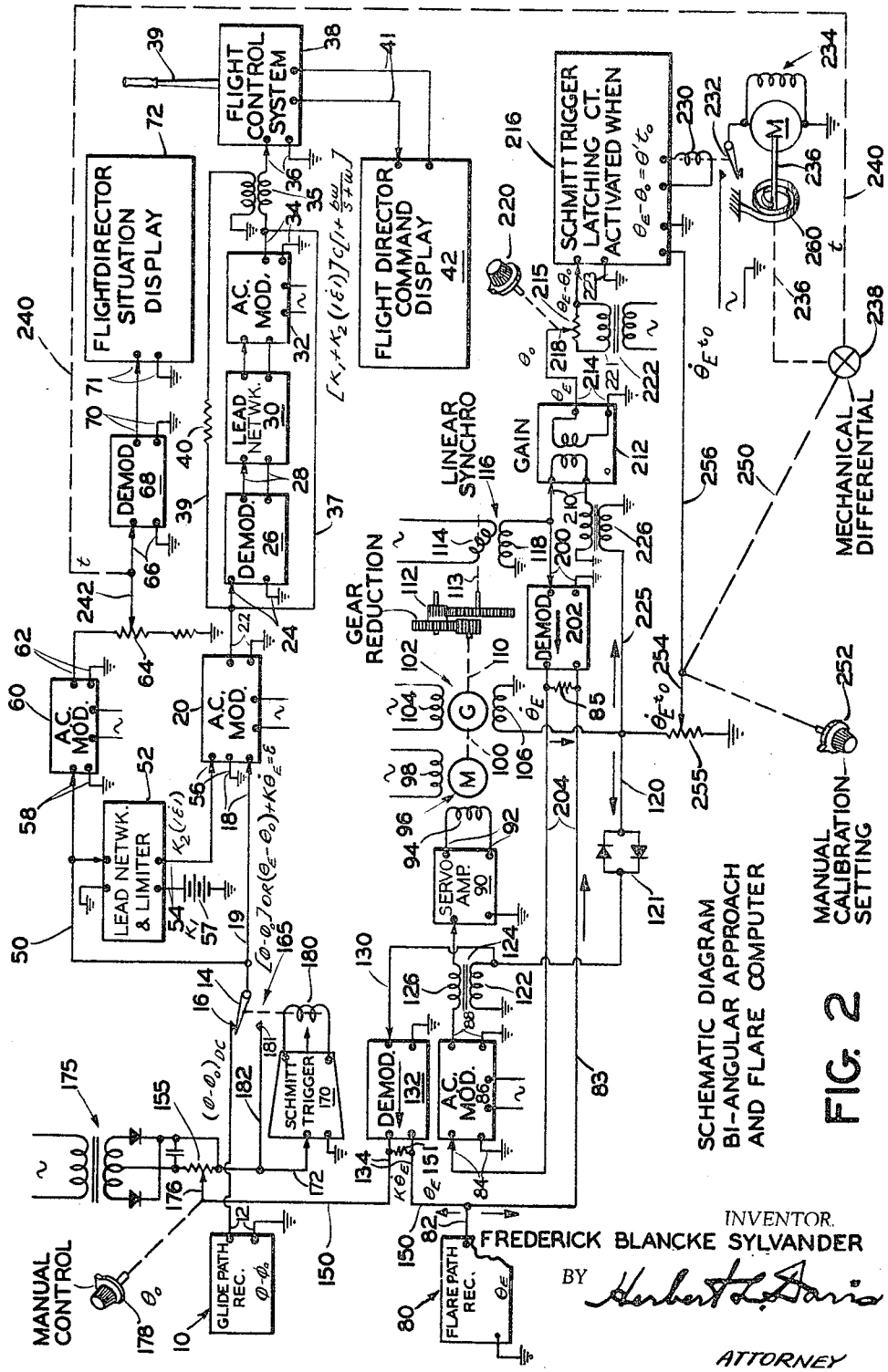

United States Patent Office 3,266,039
Patented August 9, 1966

3,266,039
ADJUSTABLE GAIN CONTROL MEANS FOR THE CONTROL SIGNAL OF A FLIGHT DIRECTOR SITUATION DISPLAY
Frederick Blancke Sylvander, Rutherford, N.J., assignor to The Bendix Corporation, Teterboro, N.J., a corporation of New Jersey
Filed Dec. 31, 1962, Ser. No. 248,329
12 Claims. (Cl. 343—108)

This invention relates to improvements in a flight control system responsive to approach and flare-out bi-angular elevation transmissions of a type such as shown in French Patent No. 1,260,282 of Abraham Tatz and Frederick Hugh Battle, Jr., and more particularly to an adjustable means for varying the gain of a signal for controlling a flight director situation display means in a system in which there is included airborne receivers operating in conjunction with a dual elevation data transmission system. The data transmission system may be located near an aircraft landing runway and so arranged as to provide control signals for appropriate automatic pilot and/or cockpit display systems in the aircraft.

An object of the invention is to provide an adjustable gain control means for desensitization of a display signal in relation to the time of the aircraft to go from a position in flight to a position at touchdown of the aircraft in the landing operation.

Another object of the invention is to provide such a control system for an aircraft in which novel means for effecting a time-to-go function is utilized to desensitize the control system of a flight director situation display means so as to vary the gain in the control system and thereby effect a constant gain in the error signal applied to the flight director situation display means as the actual approach of the aircraft tends to converge with a preset glide path and in turn with a predetermined flare path as a function of the time required for the aircraft in flight to go to the touchdown or landing position.

Another object of the invention is to provide an adjustable control means including a potentiometer having an adjustable arm held under spring tension at a preset start position and from which the arm may be adjusted at a time designated $t_0$ when it is desired to start a flare maneuver in the flight of an aircraft in going to touchdown in the landing operation of the aircraft.

Another object of the invention is to provide novel means whereby instead of computing the time-to-go by the conventional formula $$t_0 = \frac{\theta_E - \theta_0}{\dot{\theta}_E}$$

in which $\theta_E$ is the elevation angle as measured from the rear scanner transmitter B of FIGURE 1; $\theta_0$ is the desired elevation angle at touchdown; and $\dot{\theta}_E$ is the rate of change of the measured rear scanner elevation angle $\theta_E$, while the time-to-go is made available after a preset time designated $t_0$ by initiating a constant speed adjustment of the gain control means starting at the time $t_0$ and which time is detected by the equality of the signal $\theta_E - \theta_0 = \dot{\theta}_E t_0$.

Another object of the invention is to provide novel means whereby the aforenoted equality condition of the signal $\theta_E - \theta_0 = \dot{\theta}_E t_0$ may be sensed and through operation of a suitable trigger means, operation of a timing motor may be initiated effecting the aforenoted constant speed adjustment of the gain control device for the display signal of the flight director situation display means.

Another object of the invention is to provide novel operator means for adjusting the setting of the time-to-go signal as well as the setting of the timing means and gain control device in relation thereto.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings:

FIGURE 2 is a schematic diagram of a bi-angular approach and flare computer system embodying the present invention.

Figure 1:
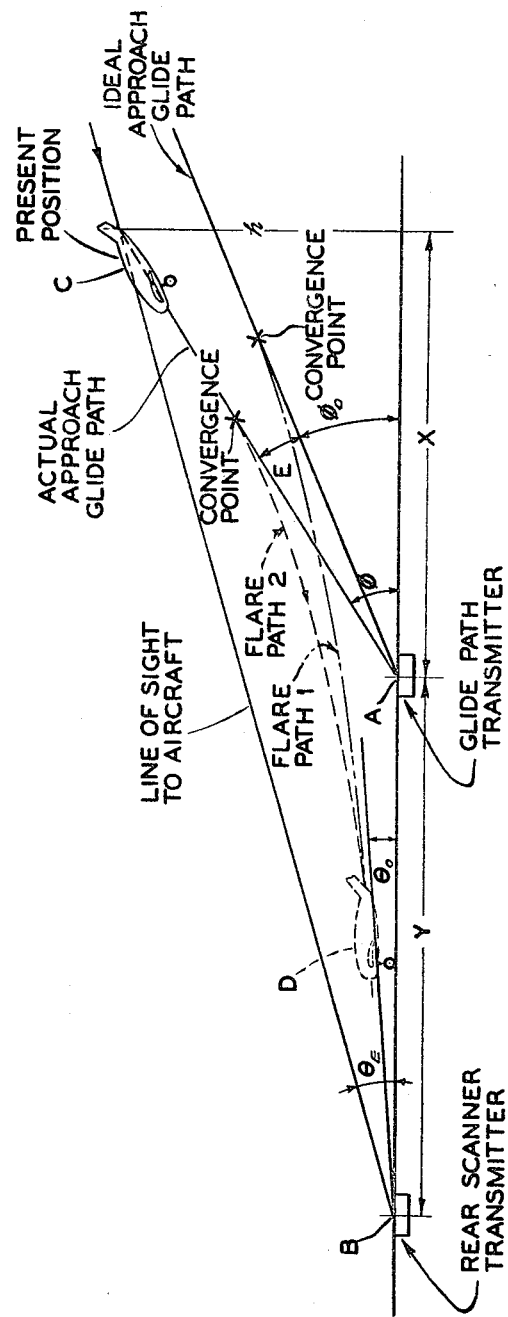
FIGURE 1 is a diagrammatic view illustrating a bi-angular signal transmitter system for controlling operation of the bi-angular approach and flare computer system embodying the invention provided herein.

Referring to the drawing of FIGURE 1, there is shown a system forming the subject matter of the present invention and which may be borne by an aircraft in flight. The system is arranged to co-operate with signals generated by elevation angle data transmitters, indicated by the letters A and B of FIGURE 1 and located near the landing runway. The geometrical relationship of the landing aircraft and the two transmitters A and B is illustrated schematically in FIGURE 1.

In the drawing of FIGURE 1, the forward scanner or glide path transmitter A may function as a normal instrument landing system fixed glide path transmitter with a known elevation angle ($\phi_0$). The rear scanner transmitter B is a device which moves a flat azimuth radio beam in an oscillating manner in the vertical plane. The aircraft indicated in the drawing of FIGURE 1 by the letter C is repeatedly illuminated by this beam and the instantaneous elevation angle ($\theta_E$) information which is encoded on the beam may be extracted by an airborne receiver carried by the aircraft C. A system embodying the subject matter of the present invention is shown schematically in FIGURE 2. It will be seen from FIGURE 1 then that inasmuch as the distance Y between the receivers A and B is known, all the position information of the aircraft C such as the altitude $h$ thereof with respect to the ground and the distance X thereof to the transmitter A may be readily determined.

Heretofore, glide path approach receivers have been arranged to operate on the beam deviation signal so as to form rate and integral term signals. In such receivers, the deviation signal and the rate and integral signals formed therefrom have been summed to provide a pitch command signal. However, in such arrangement the control means therein provided have been found to be susceptible to beam noise due to the dependence in such controls on the rate term signal for stability.

The approach capability of an arrangement controlled by such receivers has been found to be limited to a great extent by this noise on the glide slope transmission and such low approach capability has been found necessary before any flare processes may be initiated. However, if the displacement gain of the receiver were to be made a function of beam rate, such that lower gains are imposed on the system when beam rates were encountered, then the effects of noise may be minimized thereby. The control system of the receiver represented herein and shown schematically in FIGURE 2 provides for such gain modulation by beam rate, as will be explained hereinafter. Heretofore, after a flare path has been initiated and the aircraft C, as shown by dotted lines in FIGURE 1, deviates from the linear region of the glide path effected by the transmitter A, the positional information of the aircraft C must be inferred using dead-reckoning techniques, in which the initial conditions for the latter mode of operation are the known final position data on the glide path.

On the other hand, if the airborne control system were so arranged that both control and display parameters had to use rectangular coordinate data, a relatively complex conversion process would be necessary.

In the present invention, a control system is so arranged that the transmitter signal data may be used directly to generate an exponential angular flare path. Such a flare path was chosen for its ease of implementation and the further fact that constant elevation angle near touchdown may be utilized to establish mean values for both rate of descent and longitudinal position at touchdown, as shown diagrammatically in FIGURE 1.

The exponential flare path may be used with altimeter equipment to program rate of descent as a function of altitude. The parameters which are chosen as a function of the approach rate of descent and which provide a safe touchdown rate of descent and longitudinal position are the asymptotic altitude, the path curvature and the initial engagement altitude. Thus by the generation of an angular exponential flare path, the aircraft C is commanded to fly from one value of rear site elevation angle to a preselected elevation angle by the following control equation:

$$(\theta_E - \theta_o) + K\dot{\theta}_E = \text{path deviation}$$

where $\theta_E$ = elevation angle between line of sight to aircraft and the rear scanner transmitter, and the runway surface.
$\theta_o$ = desired elevation angle at touchdown.
$\dot{\theta}_E$ = rate of change of measured rear scanner elevation angle.
$K$ = gain which determines the flare path curvature.

It is only necessary to ensure that the flare path is monotonic and that the curvature is such that the aircraft C, as shown in FIGURE 1, has acquired the final elevation angle prior to touchdown so that the aircraft is in unaccelerated terminal flight, as indicated in dotted lines and shown by the letter D of FIGURE 1.

Under these conditions trim changes due to ground proximity may be handled efficiently by the flight control system or automatic pilot. The longitudinal touchdown region is determined by the height of the airborne receiver antenna above the wheels of the aircraft and the desired value of final rear site of the angular flare computation changes due to the summation of angular displacement above the desired final elevation angle $(\theta_E - \theta_o)$ and the rate of change of the elevation angle $(K\dot{\theta}_E)$. The flare control system is so arranged as to first command a nose down pitch change which is reduced to zero as the aircraft continues the approach descent prior to flare initiation. If the descent were to continue below 100 feet, the command would call for increasing nose up attitude. The control system is so arranged that the flare path is initiated only when the command is at a null. This minimizes engage transients since the approach coupler portion of the flare computer operates to maintain a null deviation in that flight region. The absolute magnitude of the rate of change of the path deviation is used in this mode of operation to minimize the effects of elevation angle convergence and track signal noise.

*Glide path signal*

During the initial phase of the approach of the aircraft, the control system uses a glide path deviation signal for vertical guidance as effected by the glide path transmitter A while a signal proportional to the absolute magnitude of the glide path beam rate is used to modulate the displacement gain. Under noisy beam conditions, the displacement gain is automatically adjusted below the mean, or no noise, value. This technique of noise desensitization improves the low approach capability of the system and provides for more reliable flare engagements. It also provides a significant degree of independence from the gain change due to beam convergence. The track error signal which is displayed on the course deviation indicator of the flight director is adjusted as a function of the time-to-touchdown to provide a course softening for manual flight control operation of the aircraft. A rate modified displacement signal is applied so as to improve the tracking accuracy of the system.

Referring now to the schematic diagram of FIGURE 2 in effecting the foregoing mode of operation, there is provided a glide path signal receiver 10 of conventional type for receiving signals from the glide path transmitter A of FIGURE 1 and arranged to provide a direct current output signal across the lines 12 indicative of the error in the position of the aircraft C or glide slope deviation. This is the standard ideal approach glide path set by the signals from the glide path transmitter A and represented by the difference between the angle $\phi$ between the actual approach path of the aircraft and ground and the angle $\phi_o$ between the ideal approach glide path and the ground. Thus the D.C. signal applied across lines 12 is dependent upon the difference between the prevailing position of the aircraft and the ideal approach glide path.

The glide path deviation D.C. signal applied across output 12 is in turn applied through a relay switch arm 14 which is initially biased to a position to close a contact 16 and through conductor 19 and the grounded output connection 12 across the input lines 18 of an A.C. modulator 20 of conventional type and energized from a suitable source of alternating current.

The output of the modulator 20 is in turn connected through lines 22 to an input 24 of a demodulator 26 of conventional type having output lines 28 connected through a conventional lead network 30 and through a second A.C. modulator 32 of conventional type and energized from the suitable source of alternating current. Output leads 34 lead from the modulator 32 to input 36 of a conventional flight control system 38 having a manually operable control 39 which may be of a conventional type or of a type such as disclosed and claimed in U.S. Patent No. 3,057,585, granted October 9, 1962 to John C. Ziegler, Lucien R. Beauregard and Harry Langer, assigned to The Bendix Corporation and arranged to selectively render the flight control system 38 operative to control the aircraft or in the alternative the control 39 may be operative to effect manual control of the aircraft.

A follow up signal is applied through a conductor 37 from the output 34 of the A.C. modulator 32 to the input of the demodulator 26 in a conventional manner. Further a rate modified displacement signal is applied from the output 34 of the A.C. modulator 32 through coupling transformer 35 and resistor 40 to the input of the demodulator 26 so as to improve the tracking accuracy of the system.

The flight control system 38 has output lines 41 connected to a flight director command display 42 of conventional type for displaying to the operator of the aircraft the condition of the flight control system 38 in conventional manner.

The signal applied across output lines 41 leading to the flight director command display, as indicated by the formula $$[K_1 + K_2(|\epsilon|)]C\left[1 + \frac{b\omega}{S + \omega}\right]$$

includes a signal $[K_1 + K_2(|\epsilon|)]$ applied at input 24 from the A.C. modulator 20 and a lead network and limiter 52, while the remainder of the formula $$C\left[1 + \frac{b\omega}{S + \omega}\right]$$

represents the transfer function of the lead network 30 as altered by the feedback circuit 37.

Also leading from the input line 19 is a conductor 50 which leads to the input of the conventional lead network and limiter 52 having output conductors 54 through which is applied a signal $K_2(|\epsilon|)$ to input lines 56 for controlling the gain of the A.C. modulator 20.

In the aforenoted arrangement, there is further provided a source of electrical energy such as a battery 57 which applies a biasing voltage $K_1$ to the signal $K_2(|\epsilon|)$ so that a total signal $K_1+K_2(|\epsilon|)$ is applied across the input lines 56 to the A.C. modulator 20 to ensure a minimum gain in the error signal applied therethrough while the limiter portion of the lead network 52 prevents the gain signal applied therethrough from exceeding a predetermined maximum value.

The conductor 50 also leads to the input 58 of modulator 60 of conventional type and energized from the suitable source of alternating current. The modulator 60 has an output 62 applied through an adjustable gain control potentiometer 64 to the input 66 of a demodulator 68 having output lines 70 leading to the input 71 of a flight director situation display 72 of conventional type for indicating to the operator of the plane the flight condition of the aircraft.

The potentiometer 64 is adjusted, as hereinafter explained, so as to vary the gain in the input signal applied to the demodulator 68 to effect a constant gain in the error signal applied across the output lines 70 of the demodulator 68 and to the input lines 71 of the flight director situation display 72 as the actual approach path of the aircraft C tends to converge with the glide path and in turn with the predetermined flare path as a function of the time required for the aircraft to go to the touchdown or landing position.

Thus the observer of the flight director situation display 72, so long as the angle of the deviation error does not change, sees a constant error display due to the constant gain in the error signal as the actual approach path of the aircraft C tends to converge with the flare path in approaching the touchdown position D.

*Flare phase of the approach*

During the second or flare path phase of the aircraft approach to the touchdown position D, a signal which is transmitted from the rear scanner transmitter "B" is received by a receiver 80 of conventional type shown diagrammatically in FIGURE 2 and arranged to provide a direct current output signal on the line 82 which is the function of $\theta_E$ where $\theta_E$ is the elevation angle of the line of sight to the aircraft in flight as measured by the rear scanner transmitter "B" of FIGURE 1.

This D.C. output signal $\theta_E$ is then summed algebraically with a demodulated signal applied through a demodulator 202 from a winding 118 of a linear synchro 116, as hereinafter explained, and the difference voltage applied to the input 84 of an A.C. modulator 86 of conventional type and energized from the suitable source of alternating current. The modulator 86 has output lines 88 connected to the input of a suitable servo amplifier 90 of conventional type. The output of the amplifier 90 is applied across output lines 92 leading to a control winding 94 of a conventional two phase motor 96 having a fixed phase winding 98 energized from the suitable source of alternating current.

The two phase motor 96 in turn drives through a shaft 100, a rate generator 102 having a fixed phase input winding 104 connected across the suitable source of alternating current, and an output control winding 106. The rate generator 102 and motor 96 are in turn connected through a shaft 110, gearing 112, and a shaft 113 to an adjustably positioned control winding 114 of the linear synchro 116. The adjustable winding 114 is connected across the suitable source of alternating current and is inductively coupled to the output winding 118 of the synchro 116.

The rate generator 102 applies an A.C. signal through the output winding 106 which is proportional to the angular rate of change of the elevation angle $\theta_E$ of the aircraft in flight. The output signal applied through the winding 106 of the rate generator 102 is applied through a conductor 120 and suitable rate signal limiting diode means 121 to a primary winding 122 of a coupling transformer 124 which is in turn inductively coupled to the secondary winding 126 of the coupling transformer 124 and connected in an output line leading from the A.C. modulator 86 to the input of the servo amplifier 90. The rate generator 102 applies through the coupling transformer 124 an antihunting signal to the input of amplifier 90 in a conventional manner.

The diode means 121 serves to limit the effective rate signal so as to prevent decrease in the slewing speed of the servomotor 96 under high signal operating conditions.

The line 120 is further connected through a line 130 to an input of a demodulator 132 of conventional type having output lines 134 connected in the line 150 leading, through a resistor 151, from one of the output lines 82 of the receiver 80 so that the D.C. output signal $\theta_E$ from the receiver 80 is then summed algebraically with the signal $K\dot{\theta}_E$ from the demodulator 132.

There is thus applied to the output line 150 a signal $K\dot{\theta}_E$ where $\dot{\theta}_E$ is derived as angular rate of change of the signal $\theta_E$ in the elevation angle follow up servo by means of the rate generator 102. A design value of K is chosen on the basis of where the flare must be initiated in order to meet the touchdown conditions.

The signal $K\dot{\theta}_E$ is then added to the signal $\theta_E$ applied to the line 150 by the input line 82 so that the signal thus applied through the line 150 to the potentiometer 155 would be indicated as a function of $\theta_E + K\dot{\theta}_E$ where $\theta_E$ is the elevation angle of the line of sight of the aircraft in flight as measured by the rear scanner transmitter "B" and $\dot{\theta}_E$ is derived approximately in the elevation angle follow up servo by means of the rate generator 102, as heretofore explained.

Switching of the outputs from the instrument landing system glide path signal $(\varphi - \varphi_0)$ to the function $\theta_E + K\dot{\theta}_E$ is accomplished automatically by a latching relay 165 operated by a solid switching or a Schmitt trigger latching circuit 170 connected by an input conductor 172 to one end of the potentiometer 155.

The potentiometer 155 is connected across a suitable source of D.C. current 175 and has an adjustable arm 176 which may be operated by a suitable operator-operative manual control 178 to set the value of a signal $\theta_0$ or level at which the relay 165 is energized by the Schmitt trigger 170.

Thus connected across the output of the Schmitt trigger 170 is winding 180 of the relay 165 arranged to adjustably position the selective relay switch arm 14 so that when the signal $\theta_E + K\dot{\theta}_E$ equals the signal $\theta_0$, the output from the instrument landing system glide path signal $(\varphi - \varphi_0)$ is disconnected from the line 19 as the switch 14 is biased by the relay winding 180 so as to close a contact 181 and connect the line 172 through the conductor 182 and switch arm 14 to the line 19.

Thus switching of the outputs of the instrument landing system glide path signal $(\varphi - \varphi_0)$ to the function $(\theta_E - \theta_0) + K\dot{\theta}_E$ is accomplished automatically by the latching relay winding 180 operated by the Schmitt trigger 170 or solid state switching circuit at the instant when $\theta_E + K\dot{\theta}_E$ equals the selected signal $\theta_0$ set by manual operator-operative control knob 178.

The design value of K is chosen on the basis of where the flare must be initiated in order to meet the desired touchdown conditions. Thereafter, the flight control system 38 and flight director situation display 72 and flight director command display 42 is controlled by the signal $\theta_E + K\dot{\theta}_E$ as applied by the rear scanner transmitter "B" rather than by the instrument glide path signal $(\varphi - \varphi_0)$ as applied by the transmitter "A" of FIGURE 1.

The output winding 118 of the linear synchro 116 is connected through conductors 200 to the input of demodulator 202 which in turn has its output 204 connected across a resistor 85 and into a conductor 83 leading to the input of the A.C. modulator 86 so as to apply therethrough a follow-up signal proportional to the angular position of the shaft 113 driven by the servomotor 96 which is summed with the D.C. signal $\theta_E$ from the receiver 80, as heretofore explained.

The foregoing structure is described and claimed in a U.S. application Serial No. 274,476, filed April 22, 1963 by Jerry Doniger and Abraham Tatz and does not form the subject matter of the invention claimed herein.

*Adjustable gain control means*

The present invention disclosed and claimed herein relates to an adjustable gain control means for the control signal of the flight director situation display 72. In effecting operation of such adjustable gain control means, the output winding 118 of the linear synchro 116 is further connected across input lines 210 of a suitable gain circuit 212 having output lines 214 connected to the input of a Schmitt trigger latching circuit 216. The output lines 214 include a potentiometer 215 having an adjustable arm 218 operatively positioned by an operator-operative knob 220 and across the potentiometer 215 is connected a secondary winding 221 of a signal biasing transformer 222 having a primary winding connected across the suitable source of alternating current. The arm 218 is so adjusted as to effect at potentiometer 215 an A.C. bias signal equivalent to the D.C. bias signal $\theta_o$ at the potentiometer 155.

There is applied across the potentiometer 215 through the transformer 222 a suitable A.C. biasing voltage designated $\theta_o$, which biasing voltage is applied in opposition to an A.C. signal voltage designated $\theta_E$ applied through the gain circuit 212 by the synchro 116 proportional to the position of the shaft 110 driven by the servomotor 96 as controlled by an output signal from receiver 80 applied through the A.C. modulator 86. The A.C. signal designated $\theta_E - \theta_o$ is applied to the Schmitt trigger latching circuit 216 through input conductors 223.

The A.C. signal obtainable from the winding 118 of the linear follow up synchro 116 will differ from the actual input signal of $\theta_E$ controlling the servomotor 96 by a slight velocity lag. However, this error may be corrected by adding a proper amount of rate signal from the rate generator 102 through a conductor 225 and coupling transformer 226 to the output of the linear synchro 116 applied to the gain circuit 212.

The Schmitt trigger latching circuit 216 is brought into operation at the point where as signal $\theta_E - \theta_o$ equals a signal designated $\theta_E t_o$ and derived as hereinafter explained. At this point the Schmitt trigger latching circuit 216 is effective to energize a relay winding 230 which in turn acts to bias the relay switch 232 to a closed position for effectively energizing a constant speed timing motor 234.

Prior to the energization of the constant speed motor 234, the shaft 236 is adjusted to an initial angular position under the bias force of a spring 260 which serves in effecting such angular adjustment to position through the mechanical differential 238, the shaft 240 and thereby the potentiometer arm 242 to a corresponding initial angular position. Further, the differential mechanism 238 is adjustably set by a shaft 250 operated by manual calibration setting knob 252 which is arranged to simultaneously position an arm 254 of a potentiometer 255 connected across the output control winding 106 of the rate generator 102. The potentiometer arm 254 is adjusted so as to provide the designated signal $\theta_E t_o$ which is applied through a conductor 256 to the Schmitt trigger latching circuit 216, so as to control energization of the relay winding 230, as heretofore explained, upon the signal designated $\theta_E - \theta_o$ being equal to the signal designated $\theta_E t_o$.

The computed time-to-go to touchdown of the aircraft after the initiation of the flare path by the activation of the relay switch 165 is needed to effect a gain control function of the display deviation signals applied through the input conductors 71 to the flight director situation display 72. This gain control function is made available by the adjustment of potentiometer arm 242 driven by the constant speed motor 234 through the shaft 236, mechanical differential 238 and shaft 240.

In the aforenoted arrangement the constant speed motor 234 is started when the predetermined time $t_o$ is reached. The signal $\theta_E$ corresponds to the angular rate of change of the signal $\theta_E$ controlling the elevation angle follow up servomotor 96 and resulting rate signal effected by means of the rate generator 102 while the designation $t_o$ is provided by the initial adjustment through the manual calibration setting 252 of the potentiometer arm 254 relative to the potentiometer winding 255.

Thus the predetermined time $t_o$ is effected by the adjustment of the potentiometer 254 so that the timing motor 234 starts to adjust the shaft 236 from an initial adjusted position, which position may be varied through adjustment of the mechanical differential 238 by the manual calibration setting 252 simultaneously with the adjustment of the potentiometer arm 254.

The adjusted position of the potentiometer arm 254 serves to preset the signal to be applied through the potentiometer 255 to the line 256 by the output from the rate generator 102, and which signal corresponds to the signal $\theta_E t_o$ as set by the adjustment of the potentiometer arm 254. Also through the manual calibration setting 252, the mechanical differential 238 is preset so as to provide essentially a fixed design parameter made adjustable for purposes of experiment.

There is further provided a spring 260 which acts on the shaft 236 of the constant speed motor 234 so as to turn the same and the shaft 240 to an initial position set by the adjustment of the mechanical differential 238 upon the control system being returned to the initial position.

The potentiometer 64 is then adjusted through the shaft 240 so as to vary the gain in the input signal applied to the demodulator 68 and to effect a constant gain in the error signal applied across the output line 70 of the demodulator 68 and to the input lines 71 of the flight director situation display 72 with the actual approach of the aircraft to the landing runway and in turn with the predetermined flare path as a function of the time required for the aircraft to go to the touchdown or landing position. Thus, so long as the angle of the deviation does not change, there is presented to the observer of the flight director situation display a constant error display due to a constant gain in the error signal as the actual approach path of the aircraft C tends to converge with the flare path in approaching the touchdown position D.

Further, in the aforenoted arrangement, it will be seen that instead of computing the time-to-go by the conventional formula $$t = \frac{\theta_E - \theta_o}{\dot{\theta}_E}$$

the time-to-go is made available after the time $t_o$ by initiating a constant speed change in the gain control device 64 starting at the time $t_o$ and which time is detected by the Schmitt trigger latching circuit 216 upon a condition of equality arising on the signals $\theta_E - \theta_o = \theta_E t_o$. This equality condition sensed by the trigger circuit 216 causes actuation of the relay switch means 230–232 to effect the operation of the constant speed timer motor 234 and thereby a constant speed adjustment of the gain control device 64.

While a single embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A control system carried by a flight vehicle, said system being under control of two land based data transmission signal devices, and said system being of a type including a first device for receiving glide path signals from one of said data transmission signal devices, a second device for receiving flare path signals from the other of said data transmission signal devices, and relay means operable by the second flare path signal receiving device for transferring control of the system from the first glide path signal receiving device to the second flare path signal receiving device; the improvement comprising servomotor means controlled by the second flare path signal receiving device, signal generating means operated by said servomotor means to provide a signal corresponding to the flare path signal received by the second device, timing means, means to initiate operation of the timing means operably controlled by the signal generating means, flight director situation display means, means to operably connect said control system to said flight director situation display means, and said connecting means including a gain control device adjustable by said timing means to vary the gain of the signals applied by said control system to the flight director situation display means.

2. A control system carried by a flight vehicle, said system being of a type including first and second devices for receiving signals from a pair of land based signal transmitters, means for selectively connecting said signal receiving devices in controlling relation in said system, and means for operatng said selective means in response to one of said signal receiving devices; the improvement comprising a flight director situation display means operatively connected in said control system and responsive to the selected controlling signal for said system, said flight director situation display means including a gain control means, timing motor means for adjusting the gain control means, and control means for initiating operation of said timing motor means in response to signals from one of said signal receiving devices.

3. The combination defined by claim 2 including servomotor means controlled by a signal from one of said signal devices, a generator driven by said servomotor means for effecting a rate signal proportional to the rate of change in the signal from said one signal receiving device, first means applying said rate signal to the control means for initiating operation of the timing motor means, and other means for applying said rate signal to the means for selectively connecting said signal receiving devices in controlling relation in said system.

4. A control system for a flight director situation display means carried by an aircraft, said system being responsive to controlling signals from a pair of land based signal transmitters, said control system including first and second devices for receiving signals from said signal transmitters, and means for selectively connecting said first and second signal receiving devices in controlling relation in said system; the improvement comprising servomotor means controlled by a first signal from one of said signal receiving devices, a generator driven by said servomotor means for effecting a second signal proportional to the rate of change in the first signal from said one signal receiving device, said flight director situation display means including a gain control means, timing motor means for adjusting the gain control means, means for applying a third reference signal in opposition to said first signal to effect a resultant differential signal, means for initiating operation of said timing motor means, said initiating means including means for applying said resultant differential signal in opposition to the second signal, and control means to cause the initiation of the operation of said timing motor means upon a predetermined relationship being effected between said resultant differential signal and said second signal.

5. The combination defined by claim 4 including operator-operative adjustment means for varying the effective rate signal.

6. A control system for a flight director situation display means carried by an aircraft, said system being responsive to controlling signals from a pair of land based signal transmitters, said control system including first and second devices for receiving signals from said signal transmitters, and means for selectively connecting said first and second signal receiving devices in controlling relation in said system; the improvement comprising servomotor means controlled by a first signal from one of said signal receiving devices, a generator driven by said servomotor means for effecting a second signal proportional to the rate of change in the first signal from said one signal receiving device, said flight director situation display means including a gain control means, timing motor means for adjusting the gain control means, means for applying a third reference signal in opposition to said first signal to effect a resultant differential signal, means for initiating operation of said timing motor means, said initiating means including means for applying said resultant differential signal in opposition to the second signal, control means to cause the initiation of the operation of said timing motor means upon a predetermined relationship being effected between said resultant differential signal and said second signal, operator-operative means for adjusting the effective rate signal, means for adjusting the point of initiation of operation of the timing motor means, and sad last-mentioned means being simultaneously adjustable by said operator-operative means together with the effective rate signal.

7. A control system for a flight director situation display means, said control system comprising means for varying the gain of a controlling signal applied through said system to said flight director situation display means, timing motor means for adjusting said gain control means, means for initiating operation of said timing motor means, differential signal responsive means for controlling said initiating means said differential signal responsive means including operator-operative means for varying the differential signal relationship at which initiation of operation of the timing motor means may be effected.

8. A control system for a flight director situation display means, said control system comprising means for varying the gain of a controlling signal applied through said system to said flight director situation display means, timing motor means for adjusting said gain control means, means for initiating operation of said timing motor means, differential signal responsive means for controlling said initiating means, said differential signal responsive means including operator-operative means for varying the differential signal relationship at which initiation of operation of the timing motor means may be effected, a mechanical differential means for operatively connecting the timing motor means to the gain control means, means for adjusting the mechanical differential means so as to vary the starting point of the timing motor means upon the initiation of operation thereof, and said mechanical differential means being simultaneously adjustable by said operator-operative means with said rate signal adjusting means.

9. The combination defined by claim 8 including spring means for returning the timing motor means to the adjusted starting position upon cessation of operation thereof.

10. A control system for a flight director situation display means carried by an aircraft, said system being operably controlled by signals from a pair of land based elevation angle data transmission signal devices, said control system including first and second devices for receiving signals from said data transmission signal devices, and means for selectively connecting said first and second signal receiving devices in controlling relation in said system; the improvement comprising servomotor means controlled by a signal from one of said signal receiving devices, a generator driven by said servomotor means for effecting a rate signal proportional to the rate of change in the signal from said one signal receiving device, said control system including a gain control means, a timing motor means, a signal generator means positioned by said servomotor means for effecting an output signal proportional to the signal of said one signal receiving device, means for providing a reference signal acting in opposition to the output signal from said signal generating means to provide a first resultant differential signal, means for applying said first differential signal in opposition to said rate signal to effect a second resultant differential signal, and means operative by said second resultant signal for initiating operation of said timing motor means upon said second resultant differential signal being of a predetermined value.

11. The combination defined by claim 10 including first operator-operative adjustment means for varying the reference signal and second operator-operative adjustment means for varying the effective rate signal.

12. The combination defined by claim 10 including operator-operative adjustment means for varying the effective rate signal, means for adjusting the point of initiation of operation of the timing motor means, and said last-mentioned means being simultaneously adjustable by said operator-operative means together with said rate signal.

References Cited by the Examiner

UNITED STATES PATENTS 3,189,904 6/1965 Tatz _____ 343—108

CHESTER L. JUSTUS, *Primary Examiner.*

T. H. TUBBESING, H. C. WAMSLEY,
*Assistant Examiners.*